Dec. 7, 1954    O. P. MONSON    2,696,363
VALVE SEAT CONSTRUCTION
Filed June 18, 1951
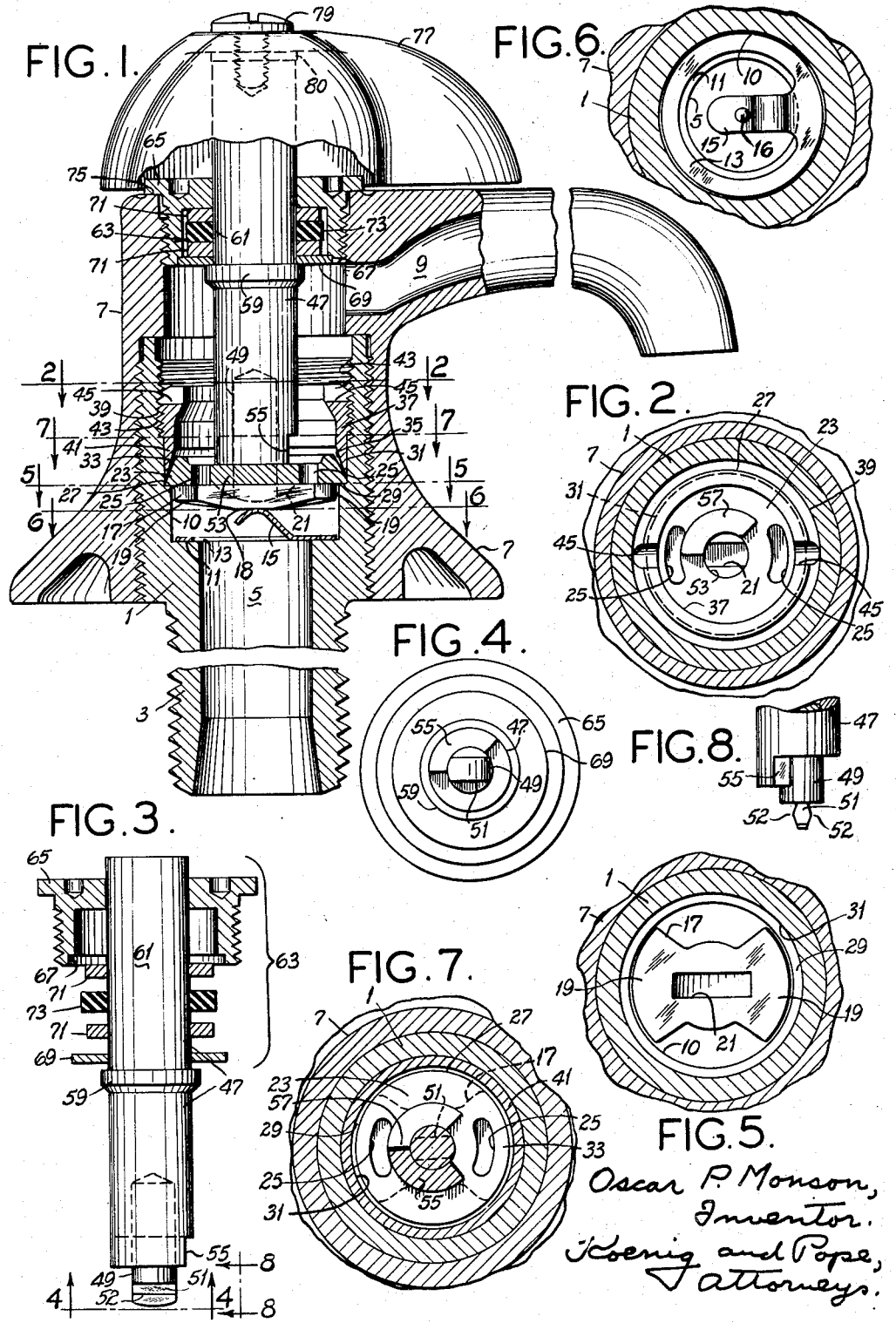
Oscar P. Monson,
Inventor.
Koenig and Pope,
Attorneys.

United States Patent Office 2,696,363
Patented Dec. 7, 1954

2,696,363

VALVE SEAT CONSTRUCTION

Oscar P. Monson, Kenosha, Wis., assignor to Monson Equipment Company, Inc., Kenosha, Wis., a corporation of Wisconsin Application June 18, 1951, Serial No. 232,129

2 Claims. (Cl. 251—316)

This invention relates to a valve seat construction for faucets or the like, and with regard to certain more specific features, to improved means for holding the seat and for preventing leakage around it, being an improvement on the construction shown in my United States patent application Serial No. 776,929, filed September 30, 1947, for Valve, now Patent 2,583,869, dated January 29, 1952.

Among the several objects of the invention may be noted the provision of an improved means for locking in place a stationary valve seat, which forms an indestructible watertight seal without the use of resilient sealing elements; and the provision of a faucet cooperatively incorporating the seat and seal in a structure which is convenient to assemble and disassemble. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a vertical section through a faucet embodying the invention;

Fig. 2 is a horizontal section taken on line 2—2 of Fig. 1 but with a key stem and seal assembly removed from the faucet, showing certain valve ports closed;

Fig. 3 is an exploded side elevation of a key stem and seal assembly removed from the faucet;

Fig. 4 is a bottom end view of the assembly shown in Fig. 3, being viewed from line 4—4 on Fig. 3;

Fig. 5 is a horizontal section taken on line 5—5 of Fig. 1;

Fig. 6 is a horizontal section taken on line 6—6 of Fig. 1;

Fig. 7 is a horizontal section taken on line 7—7 of Fig. 1; and

Fig. 8 is an end view of a key end, being observed from line 8—8 of Fig. 3.

Similar reference characters indicate corresponding parts throughout the several views of the drawings.

Referring now more particularly to the drawings, there is shown at numeral 1 the inner valve body. The body 1 has a tubular threaded extension 3 for attachment to a suitable support and to a liquid supply line such as a waterpipe. This provides the inlet 5 for the faucet. The inner body 1 is threaded into an outer body 7 having an outlet 9.

At the upper end of the inlet 5 is a counterbore 10 having a seat 11 for the reception of an annular spring washer 13. Washer 13 has a central spring finger 15 which biases upward against the bottom of a rotary valve plate 17. A small raised tip 16 of the finger 15 centrally engages a small central flat 18 on the bottom of the valve plate 17. Valve plate 17 has two lobes 19. On its bottom it is crowned with said flat at the apex. It is flat-lapped on its upper surface and centrally in this surface carries a notch 21. It is biased by the spring finger 15 against the flat-lapped bottom of a stationary valve seat 23. The seat has two ports 25 which upon 90° rotation of the valve plate 17 are covered and uncovered by the lobes 19. The limited contact between the tip 16 and flat 18, which contact is on the axis of rotation, reduces the frictional torque between the spring and valve plate.

The maximum diameter of plate 17 is slightly less than that of the flat bottom of seat 23, thus allowing some free floating lateral movement of the plate. Plate 17 and seat 23 are preferably composed of a tantalum-tungsten alloy known as "Tantung" which provides an extremely long operating life of the moving contact surface without galling.

The periphery 27 of the bottom surface of the valve seat 23 is supported upon the shouldered bottom end 29 of a second counterbore 31. This second counterbore leads to the outlet 9. The valve seat 23 is exteriorly made conical (as shown at 33) for engagement by an interior chamfered flare 35 of a hold-down bushing 37. Bushing 37 is generally cylindric, being threaded into the body at its upper end, as indicated at 39. The lower exterior of the bushing 37 is cylindric, as indicated at 41, and closely fits the cylindric counterbore 31 just below the threads 43. The upper rim of the bushing 37 is provided with slots 45 for accepting a spanner wrench for threading it into place. Thus by inserting the valve seat 23 on the shoulder 29 and threading down the bushing 37, the inner taper 35 of the bushing wedges on the outer taper 33 of the seat, thus locking the seat securely in place and forming an indestructible watertight seal around the seat. This seal is improved by the tendency of the lower relatively thin chamfered end of the bushing to expand into engagement with the cylindric wall of the counterbore 31 as this end during the tightening process rides on the outer taper on the seat 23. Thus a water-tight seal is effected both between hold-down bushing 37 and the valve seat, and between said bushing and the counterbore 31. It will be understood that before the seat 23 is inserted, the spring washer 13 and valve 17 will have been inserted below it, so that upon tightening down the valve seat the spring finger 15 is compressed, thus springingly to force the valve 17 against the bottom of the seat 23.

The flat lapping of the upper surface of the rotary valve plate 17 and of the bottom of the valve seat 23 is preferably of an accuracy (within a micro-inch) such that when they are wrung together the intervening air is sufficiently excluded to cause them to remain in contact so that they may be dropped together as a unit into the counterbore 31 above the spring washer 13 in the counterbore 10. This considerably facilitates assembly.

Rotation of the valve 17 is accomplished by a valve stem, which consists of a cylindric member 47 in the end of which is coaxially press fitted a key 49. This key is provided at its lower end with a reduced portion having side edges 52, as shown at 51. The key may be applied to the notch 21 by insertion through a central opening 53 in the valve seat 23. The edges 52 engage the sides of the notch 21 without binding thus allowing the plate 17 to float between the spring 13 and seat 23, without interference from possible misalignment of member 51. A segmental step collar 55 is provided at the lower end of the stem 47 around the key 49 which engages a stationary segmental step collar 57 on the top of the valve seat 23, as shown in Fig. 7. The arcuate extent of the steps is such that, upon turning the valve stem 47 through 90°, the valve 17 may be driven by key 49 from one limiting position with its lobes 19 covering the ports 25 to another limiting position with its lobes uncovering these ports. The stem 47 includes a shoulder 59.

Above the shoulder the stem 47 passes through a stem seal assembly 63 which is constituted by a shouldered and threaded cup-shaped nut or gland 65 for threading into a threaded upper opening of the body 7. The cup on the underside of the nut is provided with a step 67 for a pressed-in enclosing washer member 69. Within the nut 65 and held in place by the washer 69 are two sealing washers 71 which are composed of a relatively non-resilient material such as, for example, fibre, so-called melamine glass, or the like. These washers have a relatively loose fit around the stem 47 and do not hug it. They have sandwiched between them a resilient tension ring 73 composed of a suitable resilient material such as one of the synthetic rubbers, one of which is known under the trade name of Neoprene. The ring 73 is sized to be tensioned around stem 47 and to hug it. Washer 69 pushes washers 71 against tension ring 73, compressing it axially. Thus when the seal assembly 63 is pushed down over the stem 47, the washer 69 loosely engages the shoulder 59. Since the tension ring 73 adheres to the stem 47, water cannot leak out past the stem. Any that tends to leak out around the sandwich must traverse two sealing engagements by washers 71. There can be no wear on the tension ring 73 because it adheres to and moves with the stem 47 and also carries with it the protective washers 71 by reason of the axial compression on the sandwich. Thus members 47, 71 and 73 rotate as a unit, the resultant rubbing engagements being endwise.

From the above, the advantages of the invention will be clear. The stationary valve seat 23 is strongly held in a permanently sealed position on the seat 27 by means of the bushing 37. The wedging action due to the exterior conical shape of the seat and the inside flaring chamfer of the screwed-in bushing, effects without gaskets at this point an extremely reliable watertight seal between the parts 23, 37 and 1.

The seal by the tension ring 73 around the key stem and between it and the washers 71 avoids all relative motion between parts 71, 73 and 61 and eliminates all packing wear by the stem. While there is relative motion between the upper washer 71 and the body 7, and between the lower washer 71 and the washer 69, any resulting small amount of wear is automatically taken up by the tendency of the axially compressed ring 73 to expand axially.

Assembly and disassembly are convenient. To assemble it is merely necessary to drop the washer 13 in position on the seat 11, followed by insertion of the wrung-together valve 17 and valve seat 23. The bushing 37 is then screwed home by application of a spanner wrench to the slots 45. The stem seal assembly 63 may then be brought together on stem 47, bringing it to a seat on the shoulder 59. The reduced end 51 of the key 49 is inserted into the notch 21 through the opening 53 and the nut 65 is then screwed home in the body 7. A control handle 77 is then fastened to the upper end of portion 61 by a screw 79 and lock means 80. Disassembly is effected by a simple sequence of operations inverse to those above described. Should the seal parts 71, 73 after long use deteriorate, they are easily removable from the stem for replacement.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:
1. A valve seat construction comprising a body containing a circular fluid passage having a step forming a circular shoulder, a circular valve seat supported by the shoulder, said seat having an exterior inward taper from said shoulder, said passage having an unthreaded cylindric wall portion extending from the shoulder and surrounding said inward taper of the seat, said passage being threaded above said wall portion, a hollow circular bushing having a threaded portion for cooperation with said threads in the passage and having an extension which is exteriorly cylindric for close cooperation with said wall portion, the cylindric portion of the extension being smaller in diameter than the inside diameter of said threads, said extension having an inside flare engageable with said inward taper of the seat when the bushing is threaded into the body.

2. A valve seat construction made according to claim 1, wherein the end of said extension by reason of its flare is weak enough that when its inner flared portion engages the tapered portion of the seat, the end of the extension will be expanded into tight engagement with said cylindric wall of the passage.

References Cited in the file of this patent
UNITED STATES PATENTS

| Number | Name | Date |
|---|---|---|
| 1,074,191 | Mixer | Sept. 30, 1913 |
| 1,080,430 | Ferrell et al. | Dec. 2, 1913 |
| 1,926,413 | Tibbs | Sept. 12, 1933 |
| 2,080,272 | Hollman | May 11, 1937 |
| 2,211,899 | Kriegbaum | Aug. 20, 1940 |
| 2,262,224 | Daniels | Nov. 11, 1941 |
| 2,362,363 | Doede | Nov. 7, 1944 |
| 2,435,338 | Booth | Feb. 3, 1948 |
| 2,451,678 | Johnson | Oct. 19, 1948 |
| 2,549,010 | Rhodes | Apr. 17, 1951 |
| 2,583,869 | Monson | Jan. 29, 1952 |